United States Patent [19]

Wilk et al.

[11] Patent Number: 4,476,269

[45] Date of Patent: Oct. 9, 1984

[54] POLYMER DISPERSIONS OR EMULSIONS AS TEMPORARY SURFACE PROTECTANTS

[75] Inventors: Hans-Christoph Wilk, Neuss; Jürgen Geke, Düsseldorf, both of Fed. Rep. of Germany

[73] Assignee: Henkel Kommanditgesellschaft auf Aktien, Düsseldorf, Fed. Rep. of Germany

[21] Appl. No.: 450,185

[22] Filed: Dec. 15, 1982

[30] Foreign Application Priority Data

Dec. 24, 1981 [DE] Fed. Rep. of Germany ....... 3151372
Oct. 14, 1982 [EP] European Pat. Off. ........ 82109491.9

[51] Int. Cl.$^3$ .............................................. C08K 5/12
[52] U.S. Cl. .................................. 524/297; 524/296; 524/313; 524/317; 524/375; 524/376; 524/555; 524/556
[58] Field of Search ............... 524/296, 297, 313, 317, 524/375, 376

[56] References Cited

U.S. PATENT DOCUMENTS 4,033,918  7/1977  Hauber ................................ 524/297
4,277,387  7/1981  Jordan, Jr. et al. ................ 524/297

FOREIGN PATENT DOCUMENTS 2263311  12/1973  Fed. Rep. of Germany .
2295100   8/1976  France .
7567845   6/1975  Japan .
7539685  12/1975  Japan .
54-07303   4/1979  Japan .

Primary Examiner—Joseph L. Schofer
Assistant Examiner—J. M. Reddick
Attorney, Agent, or Firm—Ernest G. Szoke; Henry E. Millson, Jr.; Mark A. Greenfield

[57] ABSTRACT

Easily removable protective coatings formed from aqueous dispersions or emulsions of synthetic copolymers that can form a salt and wherein these aqueous coating materials, in addition to water, contain the following constituents:

(a) at least one copolymer which:
   (i) at a temperature of about 5° C. and above will form a film,
   (ii) contains acid or amino groups wherein the copolymer is water-insoluble therewith, but wherein the copolymer becomes water-soluble when the acid or amino groups are in the form of a salt, and
   (iii) can exist in the form of an aqueous dispersion or emulsion.
(b) at least one water-immiscible non-solvent which:
   (i) will not dissolve the copolymer in (a),
   (ii) has low volatility, and
   (iii) is liquid at room temperature;
(c) at least one nonionic emulsifier with an HLB-value of less than 10; and
(d) additional adjuvants and/or additives.

The invention also relates to the application of these coating materials as temporary surface protectors, especially for metallic and/or painted surfaces, for storage in the open air with exposure to climatic and/or mechanical influences.

21 Claims, No Drawings

POLYMER DISPERSIONS OR EMULSIONS AS TEMPORARY SURFACE PROTECTANTS

BACKGROUND OF THE INVENTION

This invention relates to coating materials based on aqueous dispersions or emulsions which are suitable for forming protective coatings which can be used, for example, for temporary protection of automobile chassis, machines or machine parts, tools, and other metallic or non-metallic items during their transportation and/or storage to protect them against climatic and/or mechanical influences. This invention relates to the formation of such protective materials which in use provide temporarily effective protection, but which are also easily removed from the surfaces which are temporarily protected when suitable aqueous solutions are used thereon.

Coatings based on waxes are quite frequently used for the temporary protection of car chassis during transportation and storage in buildings without roofs or in open air. These materials are dissolved in organic solvents or can be used in aqueous dispersions. Even though the technical properties of such waxy materials are adequate for many applications, they have the disadvantage of very low mechanical stability, especially when warmed, for example, by the rays of the sun. Therefore, attempts have been made to formulate protective coatings based on synthetic polymers which have improved mechanical properties. For example, German patent application No. 22 63 311 suggests that polyvinyl acetate or polyvinyl butyrate dissolved in organic solvents can be used. French patent application No. 22 95 100 relates to polyamides in aqueous alcohols. Acrylates in aqueous isopropanol are constituents of a two-layered coating material disclosed in Japanese patent application No. 79 07 303. The coatings obtained from the last three processes—even forgetting the disadvantages of using organic solvents—cannot be removed with aqueous cleaning solutions, but must be peeled off from the coated items.

Coatings which can be removed with weak alkaline cleaning solutions have been disclosed in Japanese patent application No. 75 67 845. Suggested therein are ethanolic solutions of acrylates which contain acid groups. In this case also organic solvents must be used. However, Japanese patent application No. 75 39 685 suggests that dispersions containing protective colloids of acrylate copolymers with a content of up to 5% acids can be used in the presence of a small amount of residual solvents. The problem of using solvents is thereby definitely diminished. However, the low acid number of these acrylate copolymers makes it difficult to redissolve the coatings after storage. Additionally, there remains the concern that the coatings will redisperse before they are completely dry. This is very important when, for example, freshly coated vehicles or chassis are immediately exposed to rain.

For practical purposes, very important desideratas are not fulfilled in this area in spite of all the systems which have been described up till now. The need still exists for temporarily effective coating materials which will quickly protect the item against mechanical influences or rain promptly after application; and that can be easily rinsed off from the protected item using simple aqueous wash solutions. The use of volatile constituents other than water as solvents should not be present as a requirement. However, this new coating material should exhibit all the desired properties with respect to temporary protection. For example, it is a requirement that temporary coatings and coating materials be stable for six months or longer. In addition, the coating materials should be able to be applied by the usual paint processes such as spraying, brushing, or dipping.

DESCRIPTION OF THE INVENTION

The present invention has as its object to make available coating materials which, without liberation of organic solvents or other volatile chemicals, can coat painted or metallic surfaces in a simple fashion by forming a protective coating thereon which is after drying immediately resistant to rain water and spray water. These protective coatings can be easily removed with conventional cleaners and/or warm water after they have served their function.

This invention, therefore, in one of its embodiments, relates to easily removable protective coatings formed from aqueous coating materials that are based on aqueous dispersions or emulsions of synthetic copolymers that can form a salt and wherein these aqueous coating materials, in addition to water, contain the following constituents:

(a) at least one copolymer which:
  (i) at a temperature of about 5° C. and above will form a film,
  (ii) contains acid or amino groups wherein the copolymer is water insoluble therewith, but wherein the copolymer becomes water soluble when the acid or amino groups are in the form of a salt, and
  (iii) can exist in the form of an aqueous dispersion or emulsion.
(b) at least one water-immiscible non-solvent which:
  (i) will not dissolve the copolymer in (a),
  (ii) has low volatility, and
  (iii) is liquid at room temperature;
(c) at least one nonionic emulsifier with an HLB-value of less than 10; and, optionally
(d) additional adjuvants and/or additives.

The coating materials of the invention are therefore polymer dispersions (in normal usage also referred to as polymer emulsions) which undergo important improvements in their properties when certain adjuvants are added thereto.

The coating materials of the invention produce temporary protective coatings with improved stability toward redispersion and, in particular, improved water resistance. At the same time, these protective coatings are easily removed from the protected items with aqueous solutions of cleaners.

The results obtained by this invention cannot be fully explained. It is speculated that the following interaction of the components occurs: after application of the coating material on the non-adsorbent substrate, the water evaporates and at a temperature of 5° C. or above the polymer films are formed. The non-solvent (b) above is not compatible with the film-forming copolymer in (a) above. Upon drying the dispersion or emulsion, the non-solvent separates from the polymer film forming a liquid layer on the surface. Apparently, the non-solvent extracts from the polymer film, at least partially, emulsifiers which are present in the aqueous coating material, particularly the ionic emulsifiers which are added during the preparation of aqueous dispersion (a). This extraction of emulsifiers results in substantial improvement in the water resistance of the polymer films. The danger of redispersion of the emulsion, for example under the influence of rain water, therefore no longer exists. In addition, due to the novel composition of the copolymer in (a) above, the subsequent removal of the resulting film with aqueous cleaning solutions is assured.

The copolymer in (a), which is the basis for the coating materials of the invention, forms films at temperatures down to 5° C. Also, as set forth above, another prerequisite for their suitability is that due to their content of acid or amino groups they are water insoluble, but when these groups form a salt, they thereupon become water soluble.

The manufacture of the copolymers of the invention for use as component (a) above is achieved by known emulsion copolymerization processes. In a first important embodiment of this invention, the polymer compounds of (a) above are copolymers with free carboxyl groups which are soluble in the alkaline range with salt formation, and therefore can be readily removed with aqueous alkaline cleaning solutions.

In accordance with this first embodiment of the invention, the copolymers in (a) consist of one or more unsaturated carboxylic acids A ("Component A") and one or more water insoluble comonomers B ("Component B"). Preferred examples of carboxylic acids A are acrylic acid, methacrylic acid, itaconic acid, citraconic acid and/or crotonic acid. Suitable, although less desirable, are fumaric acid, maleic acid, or derivatives of the above mentioned acids, for example, halogenated acrylic acids, such as α-chloroacrylic acid. Other suitable derivatives of the dicarboxylic acids mentioned above are, for example, anhydrides or half esters thereof with a $C_1$–$C_6$ alkanol. Preferably, the unsaturated carboxylic acids A are unsaturated mono- and/or dicarboxylic acids with up to 5 carbon atoms.

Comonomers B are hydrophobic monomers which are copolymerizable with Component A, and which can form the copolymer of the invention by known emulsion polymerisation techniques. This means that they can be dispersed in water. Suitable comonomers include esters of unsaturated copolymerizable carboxylic acids and/or alcohols, vinyl aromatic compounds, unsaturated nitriles or halides and/or olefins without other functionality. In particular, suitable comonomers of this group are, for example, esters of acrylic acid and/or methacrylic acid, vinyl aromatic compounds such as styrene, α-methyl styrene, and/or vinyl toluene, esters of vinyl alcohols, especially fatty acid vinyl esters, higher N-alkylamides of unsaturated polymerizable carboxylic acids, especially those of acrylic and/or methacrylic acids, as well as additional copolymerizable olefinic monomers such as of the type of acrylic and/or methacrylic nitriles, the vinylchlorides or vinylidene chlorides or also olefins such as ethylene, butadiene, chlorobutadiene and isoprene as well as similar olefins without further functionality. Common to all these comonomers B is that in addition to their hydrophobic properties they do not contain any salt forming groups.

If so desired, for the manufacture of copolymers as per (a) above, there can also be used water-soluble, nonsalt forming comonomers in small amounts. The amount thereof is usually below 30 wt. %, and preferably under 10 wt. %, in relation to the weight of the copolymers in (a). Comonomers of this type, which will be referred to as Component C hereinafter, are for example hydroxyalkyl esters of unsaturated carboxylic acids, such as hydroxyalkyl acrylate and/or hydroxyalkyl methacrylate, water-soluble N-substituted or unsubstituted amides of unsaturated carboxylic acids such as acrylamide or water-soluble N-substituted acrylamides and other water-soluble copolymerizable components such as N-vinylpyrrolidone.

Particularly suitable combinations can be selected from the monomer classes A, B and C which can form the copolymers of (a) above by known methods under conditions of emulsion copolymerization. It is preferred to manufacture suitable aqueous dispersions or emulsions, which contain crotonic acid or itaconic acid in a quantity of up to 10% by weight as comonomers of the group A and which contain esters of vinyl alcohols, especially vinyl acetate as comonomers of group B. In another especially preferred embodiment, acrylic acid and/or methacrylic acid are used as comonomers A, and as comonomers of group B, esters of acrylic and/or methacrylic acid with $C_1$ to $C_5$ alcohols, for example methyl-(meth)-acrylate, ethyl-(meth)-acrylate and/or butyl-(meth)-acrylate as well as styrene are used. 2-Hydroxyethyl-(meth)-acrylate can be used as an especially preferred comonomer of group C.

The ratios of components A, B and C are adjusted in such a manner that the copolymers containing free carboxylic acid groups are water-insoluble, but become water-soluble in aqueous alkaline cleaning solutions through salt formation on the carboxylic acid groups. Usually, the quantity of carboxylic acid functions in the copolymerizate in (a), calculated as acrylic acid, lies in the range of about 5 to 35 wt. %. This corresponds to an acid number between 35 and 270 mg KOH/g. Preferably, the carboxylic acid function in the copolymer in (a) is in the range of about 10 to 25 wt. %, calculated as acrylic acid (acid No. 75 to 200 mg KOH/g). However, even the lower amounts of free carboxylic acid functions within the above ranges, when components A, B and especially C are properly adjusted, will assure solubility of the copolymerizate in aqueous alkaline cleaning solutions. In particular, the watersolubility can be influenced when also using the normally water-soluble comonomers C in accordance with this invention.

In place of dispersions of copolymers containing acid groups as in (a) above, the coating materials in accordance with this invention can also be obtained from those copolymers which in neutral or alkaline rinse solutions are insoluble, but which are soluble in slightly acid rinse waters. In accordance with a further embodiment of this invention, as copolymers in (a) above there can be used as copolymers, in place of the unsaturated carboxylic acid functions in the unsaturated carboxylic acids A, unsaturated copolymerizable components with an amine function. Usually, the copolymer in (a) will contain from about 5 to about 60 wt. % of monomer units containing amino groups. Corresponding monomer components with amino functions are, for example, esters of unsaturated carboxylic acids with alcohols containing a tertiary amino group, or amids of unsaturated carboxylic acids with primary amins containing an additional tertiary amino group. The unsaturated carboxylic acids contain preferably up to 5 carbon atoms.

Especially suitable compounds with a basic amino or substituted amino group are copolymerizable monomers with monoalkyl or dialkyl amino alkyl ester groups such as dialkylaminoalkyl-(meth)-acrylate, for example, 2-dimethylaminoethyl-methacrylate, 3-dialkylamino-2,2-dimethylpropyl-methacrylate, and the corresponding acrylates thereof. Suitable also are other basic nitrogen-containing derivatives of such unsaturated acids - especially of acrylic acid and/or methacrylic acids - such as the corresponding basic nitrogen-containing acid amides of the above named basic esters, such as N-(3-dialkylaminopropyl-) methacrylamide and the corresponding acrylamide. Also suitable are basic nitrogen-containing copolymerizable components of the vinyl substituted pyridine compound type, for example, 2- or 4-vinylpyridine: diallylalkylamine; and similar compounds. Suitable derivatives of other unsaturated acids with basic nitrogen, for example, corresponding derivatives with maleic acid or itaconic acid, can also be used; however, they play a lesser role in this technology.

In order to adjust their film-forming properties, monomers will have to be combined in a known fashion from those which produce hard coatings with high glass temperatures and those which produce soft flexible coatings. Suitable monomers can be selected according to the known glass transition temperatures of the corresponding homopolymers. A general knowledge of polymer science is required here.

Examples of monomers which form hard coatings are acrylic acid, methacrylic acid methyl ester, and styrene. Those monomers which form soft coatings include methyl acrylate and butyl acrylate.. Suitable weight ratios between monomers which produce hard coatings (high glass temperatures) and those that form soft coatings (low glass temperatures) are usually between 4:1 and 1:1.

It can be advantageous, in accordance with this invention, to use low molecular weight copolymers in (a). For example, such low molecular weight copolymers are especially suitable when the protective coatings have to be removed in immersion baths, and rapid thickening of the immersion bath must be avoided. The mean molecular weight of such copolymers in (a) above can be for example in the range of 2000 to 30,000 g/mole.

To lower the molecular weight of the above described embodiment of the invention, regulators are added in quantities up to 20 mole % in relation to the monomers during the manufacture of the copolymer in (a). One skilled in the polymer art is familiar with a number of such compounds. In this technique, mercapto compounds are usually used. The usual mercapto compounds used for this purpose which are suitable for use herein are thioglycolic acid, mercapto-ethanol, linear and branched chain mercaptans with more than 8 carbon atoms, especially tert. dodecyl mercaptan as well as 2-hydroxyalkyl mercaptans with more than 8 carbon atoms.

For the preparation of aqueous polymer dispersions or emulsions in (a) above through emulsion polymerization, emulsifiers are employed according to known methods. Preferred are anionic emulsifiers which, if needed, are used in combination with nonionic emulsifiers. The choice of emulsifier systems depends on the polymerization conditions and the monomers that are to react with each other. For those skilled in this art, a large number of such anionic and nonionic emulsifiers are available. The anionic emulsifiers mainly consist of monoesters of sulfuric acid or of a sulfonic acid, and the nonionic emulsifiers mainly consist of reaction products of ethylene oxide with fatty alcohols or alkylphenols. In this connection, reference should be made to text books on emulsion polymerization. Especially suitable emulsifiers for those dispersions of copolymers in (a) which are based on acrylates are fatty alcohol ether sulfates as well as sulfosuccinic acid esters of ethoxylated alkylphenols.

The emulsion polymerization starts out in a known manner through the usual free radical initiators. Suitable therefore are the salts of peroxydisulfuric acid in combination with reducing agents. Organic free radical initiators such as azo compounds or organic peroxides can also be used.

As disclosed earlier, it is probably important in order to obtain the results of this invention, that a substantial quantity or at least not an insignificant quantity of the emulsifier, with is a reaction adjuvant for the manufacture of aqueous dispersions or emulsions in (a) above, leaves the polymer film dissolved in the nonsolvent (b) during drying and film formation.

A number of liquids can be used as organic non-solvents in accordance with (b) above. As a rule they should fulfill the following requirements: low volatility at room temperature: viscosity less than 100 Pas: immiscible with water: melting point less then 10° C.; as well as biologiclly degradable.

The non-solvent (b) can, for example, be selected from the group of paraffins or isoparaffin mixtures with preferably more than 10 carbon atoms which are liquid at room temperature and which have low volatility or can be selected from carboxylic acids and/or alcohols with more than 6 carbon atoms, or ether alcohols with more than 10 carbon atoms, and/or the corresponding esters of the above which are liquid at room temperature and are of low volatility.

Particularly suitable are aliphatic or aromatic hydrocarbons with more than 8, and preferably with more than 15 carbon atoms. Preferred are cuts of synthetically produced isoparaffins which are commercially available with various boiling points. In a further embodiment of this invention, the naturally occurring fatty acids, their derivatives or secondary products can be used so long as they fulfill the general conditions mentioned above for the non-solvents. Suitable are, for example, liquid cuts of naturally occurring fatty acids which have high proportions of fatty acids with less than 12 carbon atoms and/or one or more double bonds. Suitable, also, are branched chain fatty acids or fatty acid mixtures, for example, isononanoic acid. Also, esters of the known fatty acids with alcohols with up to 18 carbon atoms and preferably with up to 3 carbon atoms are suitable so long as their melting points are not over about 10° C.

Suitable also are fatty alcohols and their mixtures. Also preferred are mixtures having a high proportion of hexanol and/or octadecenol as well as branched chain fatty alcohols which can be prepared through dimerization (Guerbet reaction). Also suitable are ether alcohols with up to 20 carbon atoms especially those which can be prepared through ring opening of olefin oxides by means of hydroxyl compounds, for example, with monohydroxy, dihydroxy, and/or trihydroxy alcohols. Finally, esters of aromatic or aliphatic mono-and/or polycarboxylic acids, especially esters of aliphatic dicarboxylic acids, with aliphatic alcohols having up to 20 carbon atoms are suitable. Preferred here are esters of adipic acid, sebacic acid and phthalic acid.

A preferred group of non-solvents in (b) above are those compounds which are liquid at room temperature and which have low volatility, and are usually referred to when used in the synthetic materials industry as "softening agents", which however when used with the copolymers of the invention in (a) above do not exhibit typical softening functions. Such softening agents are: esters of natural fatty acids of about 12 to about 18 carbon atoms, and those which are dimerized from lower alcohols having about 6 to 10 carbon atoms through the Guerbet reaction and subsequent oxidation. The above fatty acids can be esterified with lower alcohols such as methanol, ethanol, or butanol. Additional suitable softening agents are those based on phthalic acid, in particular those with alcohols having from 4 to 10 carbon atoms. A typical representative thereof is dioctylphthalate. Additionally, there can be used chlorinated paraffins, or oxidized hydrocarbons, or so-called softening agents based on polyesters, provided these compounds do not have a melting point above about 30° C., preferably not above about 10° C.

According to a very special embodiment of this invention, these non-solvents or softening agents as (b) above are triglycerides with more than one double bond per molecule. Suitable triglycerides are, for example, soya bean oil, coconut oil, sunflower oil or linseed oil.

In addition to the above named compounds, there can also be used a large number of other organic liquids as non-solvent (b). In addition, those skilled in the art can determine from the characteristics set forth above for the components in (a) and (b) whether or not an organic liquid compound selected as non-solvent (b) above is suitable for use herein. For example, the following simple test can be used with respect to the determination of required solubility characteristics of (b): a dried piece of the polymer coating produced from (a) above is immersed at room temperature in an excess of an organic liquid being tested as component (b) to determine whether the polymer coating sample will go completely into solution or not.

In order to keep the non-solvent in (b) above in finely dispersed form in an aqueous polymer dispersion, and in order to prevent the creaming or settling of the liquid organic non-solvents in the aqueous polymer dispersions, an emulsifier or emulsifying system is used therewith. Suitable are emulsifiers having an HLB value of smaller than 10, and preferably smaller than 6. Suitable commercial products which can be used in accordance with the invention are, for example, sorbitan esters, i.e. conversion products which result with water separation during esterification of sorbitol with fatty acids. Especially suitable is sorbitan monooleate. Additional suitable emulsifiers are reaction products of fatty alcohols or alkylphenols with ethylene oxide. Particularly preferred nonionic emulsifiers of this type are the reaction products of nonylphenol with 2 to 7 moles of ethylene oxide and/or the reaction product of a fatty alcohol with more than 10 carbon atoms with 2 to 8 moles of ethylene oxide and/or a sorbitan ester. Especially suitable emulsifiers in this group are the reaction products of nonylphenol with 5 ethylene oxides as well as the reaction product of oleyl alcohol with 2 ethylene oxides.

In addition to components (a), (b) and (c) there can be used in the coating materials, if desired, additional standard adjuvants. Examples are dyestuffs, pigments, stabilizers, corrosion inhibitors, and the like.

The method used for the manufacture of the coating materials of the invention is not very critical. Starting with the basic dispersion of the copolymerizate in (a) above, there is then added the adjuvants in (b), (c) and as needed, (d). Preferred is to premix the components in (b) to (d), followed by the addition of the resulting premixture to the aqueous dispersion or emulsion of the copolymerizate in (a) above. Separate addition of the components in individual sequence is also possible. Another possibility for the manufacture of the coating materials of the invention consists of adding the components of (b) to (d) prior to or during the polymerization of the copolymerizate in (a) above.

The coating materials of the invention preferably contain, in aqueous dispersion, the above described components in the following ratios:

about 30 to about 60 wt. % of the film-forming copolymerizate in (a);

about 5 to about 50 wt. % of the non-solvent or "softening agent" in (b); and about 0.05 to about 2.5 wt. % of the nonionic emulsifiers in (c);

wherein the amounts given in all instances relate to the weight of the aqueous dispersion of the copolymerizate in (a), that is, without the addition of the components (b) to (d). The adjuvants used in (d)—that is the dyestuffs, corrosion inhibitors, pigments, or stabilizers to protect against thermal influence or against the influence of UV-light can be used in quantities of about 0.05 to about 5.0 wt. %, also in relation to the weight of the aqueous dispersion of the copolymerizate in (a). An especially suitable coating material of the invention contains the following ingredients:

As Component (a): in an alkaline medium, water-soluble mixed copolymers based on acrylic polymers with 5 to 35 wt. % carboxylic acid functions (calculated as acrylic acid) as well as additional comonomers selected from the group alkyl-(meth)-acrylates, hydroxyalkylacrylates, styrene, and acrylonitrile.

As Component (b): hydrophobic liquid "softening agent" with a melting point under 10° C, wherein the weight ratio of (a):(b) is between about 20:1 and about 20:10.

As Component (c): nonionic emulsifiers having an HLB-value between 2 and 10 in a quantity of 1 to 5 wt. % based on the sum of components (a) and (b), as well as, if desired, As Component (d): dyestuffs, pigments, and/or stabilizers.

In addition, an object of this invention is the application of such emulsions for temporary surface protection, particularly on metallic and/or painted surfaces, such as car chassis and other items which have to be stored in the open and which must be protected against climatic and/or mechanical influences. Protection and freedom from damage is possible in accordance with this invention for months up to about 2 years against influences of the atmosphere - even where it is a relatively aggressive one, such as near open water and under relatively strong UV-influence.

The application of the protective coating is carried out in accordance with the usual paint techniques. The coatings can be applied by spraying, brushing, dipping, or wiping.

It may be advantageous to heat the object to be coated or the coating material or both above room temperature in order to obtain a faster evaporation of the water from the aqueous dispersions. In so doing it is possible in the initial phase to supress any corrosion tendency of the object to be coated.

In order to obtain thin coatings for individual needs, the coating material can be diluted with water. In this event, however, larger quantities of water must be evaporated in order to form the film.

The following examples set forth the manufacture of aqueous dispersions of
1. polymers containing acid groups, as well as
2. polymers containing amino groups.

In the following examples, the coating materials of the invention and their use are shown. These examples are given for illustration purposes only and not to limit the invention.

EXAMPLES

Preparation of the basic dispersions in (a)

1. Polymers containing acid groups (I–III)

In a three-necked flask equipped with stirrer, reflux condenser, nitrogen intake, and a dropping funnel, there was introduced a mixture of
- 477.0 grams of monomers,
- 9.5 grams of sodium lauryl-(polyethoxy)-sulfate (10 moles EO),
- 9.5 grams of nonylphenoxy-(polyethoxy)-disodium sulfosuccinate (10 moles EO),
- a total of 500.0 grams of water, and
- 4.0 grams of ammonium peroxydisulfate.

With vigorous stirring and nitrogen flow, the reaction mixture of the above ingredients except for the ammonium peroxydisulfate, was slowly warmed in a water bath. The ammonium peroxydisulfate was dissolved in water and added dropwise thereto.

The monomer mixtures had the compositions given in Table 1 below.

TABLE 1

|  | I | II | III |
|---|---|---|---|
| Ethylacrylate | 64.5% | 64.5% | 64.5% |
| Styrene | 15.3% | 10.3% | 20.3% |
| Methacrylic acid | 15.3% | 20.3% | 10.3% |
| HEMA (hydroxyethyl-methacrylate) | 3.4% | 3.4% | 3.4% |
| Thioglycolic acid | 1.5% | 1.5% | 1.5% |

2. Polymers containing amino groups (IV)

In a three-necked flask equipped with stirrer, reflux condenser, nitrogen intake, and a dropping funnel, there was introduced a mixture of
- 160 grams of methylacrylate,
- 100 grams of ethylacrylate,
- 140 grams of dimethylaminoneopentylmethacrylate,
- 9.5 grams of sodium lauryl-(polyethoxy)-sulfate (10 moles EO),
- 9.5 grams of nonylphenoxy-(polyethoxy)-disodium sulfosuccinate (10 moles EO),
- a total of 500.0 grams of water, and
- 1.0 grams of azo-bis-cyanopentanoic acid.

Under vigorous stirring and nitrogen flow, the reaction mixture was warmed in a water bath to 90° C. and maintained for 2 hours at this temperature.

The protective coatings were obtained as follows: To 90 grams of a dispersion as per I through IV, 9 grams an organic non-solvent 1-5 (Table 2) and 1 gram of sorbitan monooleate was stirred therewith.

Table 2

1 = Dioctylphthalate
2 = Ricinoleic acid
3 = Isohexadecanol
4 = techn. fatty acids ($C_{16/18}$)
5 = Isoparaffin, boiling point 200° to 230° C.

The coating materials so obtained were wiped on glass plates of the dimensions 10×20 cm in a wet film thickness of 100 μm.

For comparison purposes, the dispersions I, II, III and IV were also applied without the addition of an organic non-solvent.

After the transparent films were developed (5-15 minutes), the glass plates were immersed in a vertical position half-way into demineralized water at 40° C. Films from dispersions without the non-solvent dissolved after 1-3 minutes and were partially redispersed, whereas the films with the addition of the non-solvent did not even form any blisters after 60 minutes.

In a second test, the coating materials based on dispersions I to III were sprayed in a cross hatched pattern on steel sheets measuring 7×15 cm, which after drying in air were aged for an hour at 80° C. in a drying oven. In order to test for film removal, they were dipped in a cleaning solution at 25° C. and after 1 or 10 minutes dwell time, rinsed off under running water at 50° C. The cleaning solution consisted of 96 wt. % water, 3 wt. % ammonium chloride, 1% of a product consisting of 10 moles of ethylene oxide and 1 mole of nonylphenol, and adjusted with ammonia to a pH value of 9. In the following Table 3, various coating materials are given showing the results obtained after a 1 or 10 minute dip as shown in the last column.

TABLE 3

| Example | Resin based on Monomer Composition | Softening Agent | Immersion Time 1 min. | 10 min. |
|---|---|---|---|---|
| 1 | I | 1 | 0 | + |
| 2 | I | 2 | + | + |
| 3 | I | 3 | − | + |
| 4 | I | 4 | 0 | 0 |
| 5 | I | 5 | − | + |
| 6 | I | 1 (¼ of the quantity) | 0 | + |
| 7 | II | 2 | 0 | + |
| 8 | III | 2 | 0 | + |

− = not dissolved
0 = partially dissolved
+ = fully dissolved

In an analogous fashion, coatings that are based on basic dispersion IV can be dissolved in acid solutions, for example, 5 wt. % acetic acid in water, within 10 minutes.

COMPARATIVE EXAMPLES

A dispersion based on the following monomer mixture was prepared:
Ethylacrylate: 64.5%
Styrene: 29.6%
Methacrylic acid: 1.0%
H E M A: 3.4%
Thioglycolic acid: 1.5%

The dispersion was mixed with non-solvents 1-5 and used for protective coatings. The coatings showed good resistance to neutral water but even in alkaline water did not dissolve within 30 minutes.

What is claimed is:

1. An aqueous coating material for applying an easily removable protective coating to a surface consisting essentially of an aqueous dispersion or emulsion containing:
   (a) a copolymer capable of forming a film at a temperature of 5° C. or above which contains acid groups or amino groups and is in the form of an aqueous dispersion or emulsion, wherein the acid groups are unsaturated mono and/or dicarboxylic acids and/or derivatives thereof, and the amino groups are esters of unsaturated carboxylic acids with alcohols containing tertiary amino groups and/or amides of unsaturated carboxylic acids with primary amines containing an additional tertiary amino group, and wherein the copolymer is substantially insoluble in water but becomes soluble therein when the acid groups or amino groups are in the form of salt;

(b) a non-solvent which is liquid at room temperature, of low volatility, immiscible with water, and insoluble in the copolymer in (a); and (c) an emulsion or dispersion producing quantity of at least one nonionic emulsifying agent having an HLB-value of less than 10.

2. An aqueous coating material in accordance with claim 1 wherein the copolymer in (a) contains free carboxyl groups in number sufficient to render the copolymer water soluble under alkaline conditions.

3. An aqueous coating material in accordance with claim 2 wherein the copolymer in (a) is a copolymer of (i) at least one member selected from the group consisting of an unsaturated monocarboxylic acid and and an unsaturated dicarboxylic acid having up to 5 carbon atoms, and (ii) at least one water insoluble comonomer selected from the group consisting of esters of unsaturated copolymerizable carboxylic acids, unsaturated copolymerizable alcohols, vinyl aromatic compounds, unsaturated nitriles, unsaturated halides, and olefins without other functionality, which is copolymerizable with component (i) to form a copolymer which is capable of forming a dispersed closed phase in water.

4. An aqueous coating material in accordance with claim 3 wherein the copolymer also contains at least one water soluble comonomer which is a hydroxyalkyl ester of an unsaturated carboxylic acid, an N-substituted or unsubstituted amide of an unsaturated carboxylic acid, and other water-soluble copolymerizable components.

5. An aqueous coating material in accordance with claim 3 wherein the copolymer component (i) is one or more of the following: acrylic acid, methacrylic acid, itaconic acid, citraconic acid, crotonic acid, fumaric acid, maleic acid, an anhydride of one of the above dicarboxylic acids, and a half ester of one of the above dicarboxylic acids with a $C_1$-$C_6$ alkanol.

6. An aqueous coating material in accordance with claim 3 wherein the quantity of component (i) in the polymer, calculated as acrylic acid, is in the range of from about 5 to about 35 wt. %.

7. An aqueous coating material in accordance with claim 6 wherein said range for component (i) is from about 10 to about 25 wt. %.

8. An aqueous coating material in accordance with claim 1 wherein the comonomer used to form the copolymer is at least one of the following: an ester of an unsaturated carboxylic acid, an ester of an unsaturated alcohol, an N-substituted amide of an unsaturated carboxylic acid, a vinyl aromatic compound, an unsaturated nitrile, an unsaturated halide, and an olefin without further functionality.

9. An aqueous coating material in accordance with claim 8 wherein the comonomer is selected from the group consisting of an alkyl (meth)-acrylate, a hydroxyalkyl(meth)-acrylate, styrene, and acrylonitrile.

10. An aqueous coating material in accordance with claim 7 wherein component (i) is at least one of crotonic acid and itaconic acid, and component (ii) is vinyl acetate.

11. An aqueous coating material in accordance with claim 1 wherein the copolymer in (a) contains from about 5 to about 60 wt. % of amino group-containing monomers.

12. An aqueous coating material in accordance with claim 11 wherein the amino group-containing monomers are at least one of the following: an amino group-containing ester of an unsaturated carboxylic acid, an amino group-containing amide of an unsaturated carboxylic acid.

13. An aqueous coating material in accordance with claim 11 wherein the amino group-containing monomer is at least one amino group-containing monomer of a compound selected from the group consisting of dimethylaminoethylacrylate, dimethylaminopropylacrylate, dimethylaminoneopentylacrylate, diethylaminoethylacrylate, diethylaminopropylacrylate, diethylaminoneopentylacrylate, and the methacrylate compound corresponding to any of the above.

14. An aqueous coating material in accordance with claim 1 wherein component (b) is selected from the group consisting of a mixture of paraffins, a mixture of isoparaffins, a carboxylic acid having more than 6 carbon atoms, an alcohol having more than 6 carbon atoms, an ether alcohol having more than 10 carbon atoms, an ester of said carboxylic acid, an ester of said alcohol, and an ester of said ether alcohol.

15. An aqueous coating material in accordance with claim 1 wherein component (b) contains at least one of the following: an ester of a naturally occurring straight or branched chain fatty acid with a $C_1$-$C_4$ monoalcohol, and an ester of a dicarboxylic acid with a $C_6$-$C_8$ alcohol.

16. An aqueous coating material in accordance with claim 15 wherein the ester of a dicarboxylic acid is an ester of phthalic acid.

17. An aqueous coating material in accordance with claim 1 wherein component (b) is a naturally occurring triglyceride.

18. An aqueous coating material in accordance with claim 1 wherein the nonionic emulsifying agent in (c) is at least one of the following: a reaction product of one mole of nonylphenol with from 2 to 7 moles of ethylene oxide; a reaction product of one mole of a fatty alcohol having more than 10 carbon atoms with from 2 to 8 moles of ethylene oxide; and a sorbitan ester.

19. An aqueous coating material in accordance with claim 1 wherein the copolymer in (a) is present in a quantity of from about 30 to about 60 wt. %, component (b) is present in a quantity of from about 5 to about 50 wt. %, and component (c) is present in a quantity of from about 0.05 to about 2.5 wt. %, all weight percents being based on the weight of the aqueous dispersion or emulsion in (a).

20. An aqueous coating material in accordance with claim 1 wherein the copolymer in (a) contains from about 5 to about 35 wt. % of carboxylic acid-containing monomers and at least one comonomer selected from the group consisting of an alkyl(meth)-acrylate, a hydroxyalkylacrylate, styrene, and acrylonitrile; component (b) is a "softening agent" having a melting point less than 10° C., and wherein the weight ratio of component (a): component (b) is between about 20:1 and about 20:10; and the nonionic emulsifying agent in (c) has an HLB-value between about 2 and about 10, and is present in a quantity of from about 1 to about 5 wt. %, based on the sum of components (a) and (b).

21. An aqueous coating material in accordance with claim 20 wherein the copolymer in (a) contains monomers, the homopolymer of which have relatively high glass temperatures, and monomers, the homopolymer of which have relatively low glass temperatures, in a weight ratio thereof of from about 4:1 to about 1:1.

* * * * *